(No Model.)  2 Sheets—Sheet 1.
E. KIME.
LAND ROLLER AND PULVERIZER.
No. 502,301.  Patented Aug. 1, 1893.
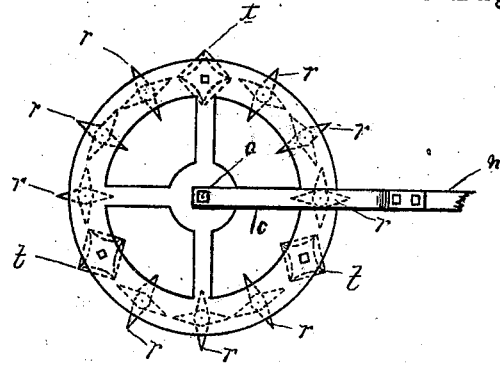
Fig-1-
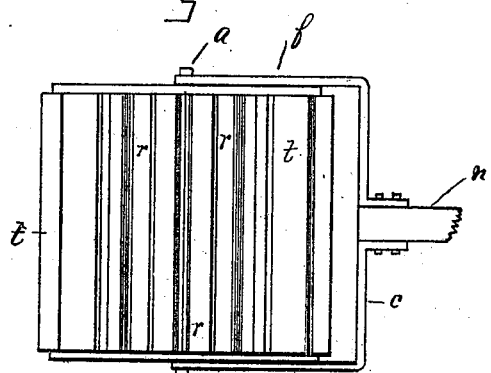
Fig-2-
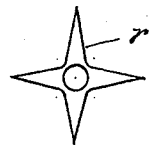
Fig-3-
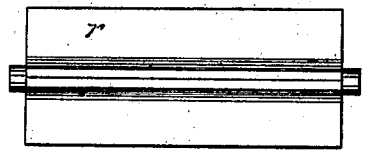
Fig-4-
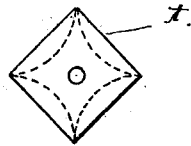
Fig-5-
Fig-6-
WITNESSES
J. J. Woodworth
Geo. H. Crowley
INVENTOR
Enoch Kime
By L. D. Woodworth
Attorney (No Model.)  2 Sheets—Sheet 2.
E. KIME.
LAND ROLLER AND PULVERIZER.
No. 502,301.  Patented Aug. 1, 1893.
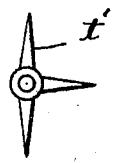
Fig-7-
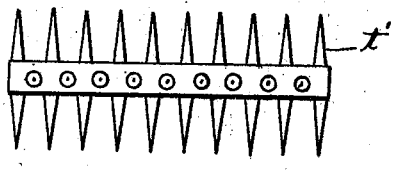
Fig-8-
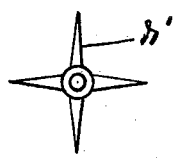
Fig-9-
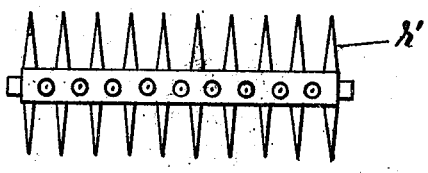
Fig-10-
WITNESSES
J. J. Woodworth.
Geo H Crowley
INVENTOR
Enoch Kime
By L. D. Woodworth
Attorney

UNITED STATES PATENT OFFICE.

ENOCH KIME, OF MILTON, OHIO.

LAND ROLLER AND PULVERIZER.

SPECIFICATION forming part of Letters Patent No. 502,301, dated August 1, 1893.

Application filed March 11, 1893. Serial No. 465,560. (No model.)

*To all whom it may concern:*

Be it known that I, ENOCH KIME, a citizen of the United States, residing at Milton, in the county of Mahoning and State of Ohio, have invented certain new and useful Improvements in Land Rollers and Pulverizers; and I do hereby declare the following to be a full, clear, and exact description of my invention, such as will enable others skilled in the art to which it appertains to make and use the same, reference being had to the accompanying drawings, which form part of this specification.

My invention is a land-roller and pulverizer combined in one mechanism, for use in preparing soil for crops, and its object is such a combined mechanism as will by one operation effectually pulverize and loosen the soil to a depth something greater than the cover of the seed, and at the same time reduce the surface to a level without impacting it, as is done by other rollers, thus providing a new agricultural implement that is of great value in the tillage of land.

I intend my invention mainly for use in my land roller patented to me bearing the date of January 10, 1893, and numbered 489,587, as a substitute for the several rollers $r$ therein, but it may be used with excellent results singly as I have illustrated and shall describe it herein.

Figure 1. is a side elevation view of my combined roller and pulverizer complete. Fig. 2. is a top or plan view of the same. Fig. 3. is an end view of the flanged sub-roller $r$. Fig. 4. is a side or longitudinal view of the same; and Fig. 5. is an end view of the flanged tie $t$. Fig. 6 is a side longitudinal view of the same. Fig. 7 is an end view of the spiked tie $t'$. Fig. 8 is a longitudinal side view of the same. Fig. 9 is an end view of the spiked roller $r'$; and Fig. 10 is a side longitudinal view of the same.

The two similar wheels $w$ $w$ are preferably hub and spoke wheels to permit the escape of earth through the open spaces between the spokes, and are iron castings resembling large gear wheels minus the cogs. The rims or fellies are of sufficient breadth and thickness to give openings for the bearings of the journals that appear at each end of the flanged sub-rollers $r$ which extend between the two rims, and for the rigid mortise and tenon attachments of the ties $t$, that also extend between the two rims and are to hold the wheels in relative positions. The hubs have the usual openings for the fixed axle $a$, the outer ends of which axle are attached to the rearward ends of the neap frame timbers $ff$ that extend forward from the axle to a point beyond the perimeters of the wheels, and are connected by the crossbar $c$ to which the neap $n$ for draft is attached in the usual manner. The similar ties $t$ are each a casting of iron resembling in form the flanged sub-roller $r$ minus the inner flange (when in place) and the journals. They are to hold the wheels $w$ $w$ parallel and suitably separated forming an open cylinder. At each end, as stated, they have rigid mortise and tenon connections with the rims of the two wheels, and are preferably four in number and equidistant from each other.

The flanged sub-roller $r$ is an iron casting, in form a rod having journals at each end and intermediately longitudinal and equidistant flanges, preferably four in number, and triangular in transverse lines. The flanges are of such height that when in place in the roller mechanism those pointing outward project beyond the wheel rims suitably to enter the earth to the depth of about four inches, but this may be varied as desired. The sub-rollers $r$, their journals having bearings in the sides of the wheel rims, as stated, are placed successively around the rims and so near together that when rotated the edges of the flanges barely escape each other. For use in refractory ground I make the spiked sub-rollers $r'$ shown at Figs. 9 and 10 in which rows of suitable spikes or teeth appear in lieu of the flanges in the sub-rollers $r$ to which it is otherwise similar. The tie $t'$, used in my spike land roller, is also similar to the tie $t$ already described except that rows of spikes or teeth appear in place of the flanges.

The means of draft is the neap $n$ with its branches $ff$ and $c$ attaching to the fixed axle $a$ and need not be described as it is an old and well understood means, which may be discarded for another, as it will be when my roller is applied in my former invention, which is my chief purpose, as already stated.

The mechanism and operation of my combined land roller and pulverizer will now be understood.

As the wheels $w\ w$ turn in forward movement the flanged sub-rollers $r$ revolve, their flanges entering the soil at successive points near together, breaking up all clods and mellowing the ground to the depth of the penetration of the flanges, which is determined by their breadth, leaving the general surface over which the roller has passed level, but without that impacted condition, left by other rollers, which measurably excludes the air and moisture that both contribute to and bring from the soil its plant feeding qualities.

What I claim is—

In land rollers the combined land roller and clod pulverizer formed by a succession of the longitudinally flanged sub-rollers $r$ having bearings at each end in the facing sides, near the peripheries, of the two diametrally parallel wheels $w\ w$, which are held in relative positions by the flanged ties $t$ that are rigidly attached at each end to the rims of the respective wheels, such wheels $w\ w$ having the fixed axle $a$ to which means of draft are attached, substantially as described and for the purpose expressed.

In testimony whereof I hereunto affix my signature in the presence of two witnesses.

ENOCH KIME.

Witnesses:
G. W. TUCKER,
C. L. BALDWIN.